United States Patent Office 3,528,198
Patented Sept. 15, 1970

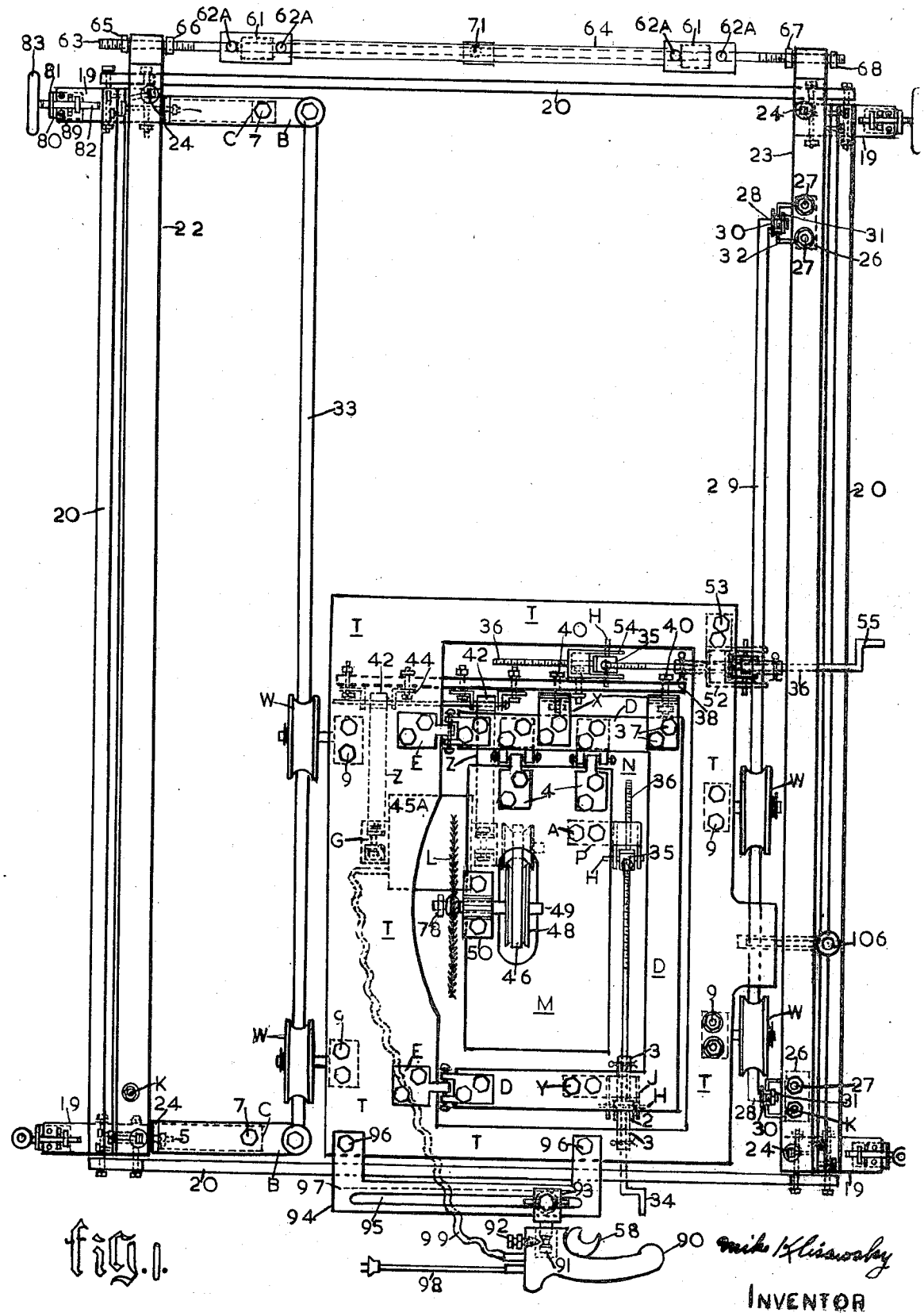

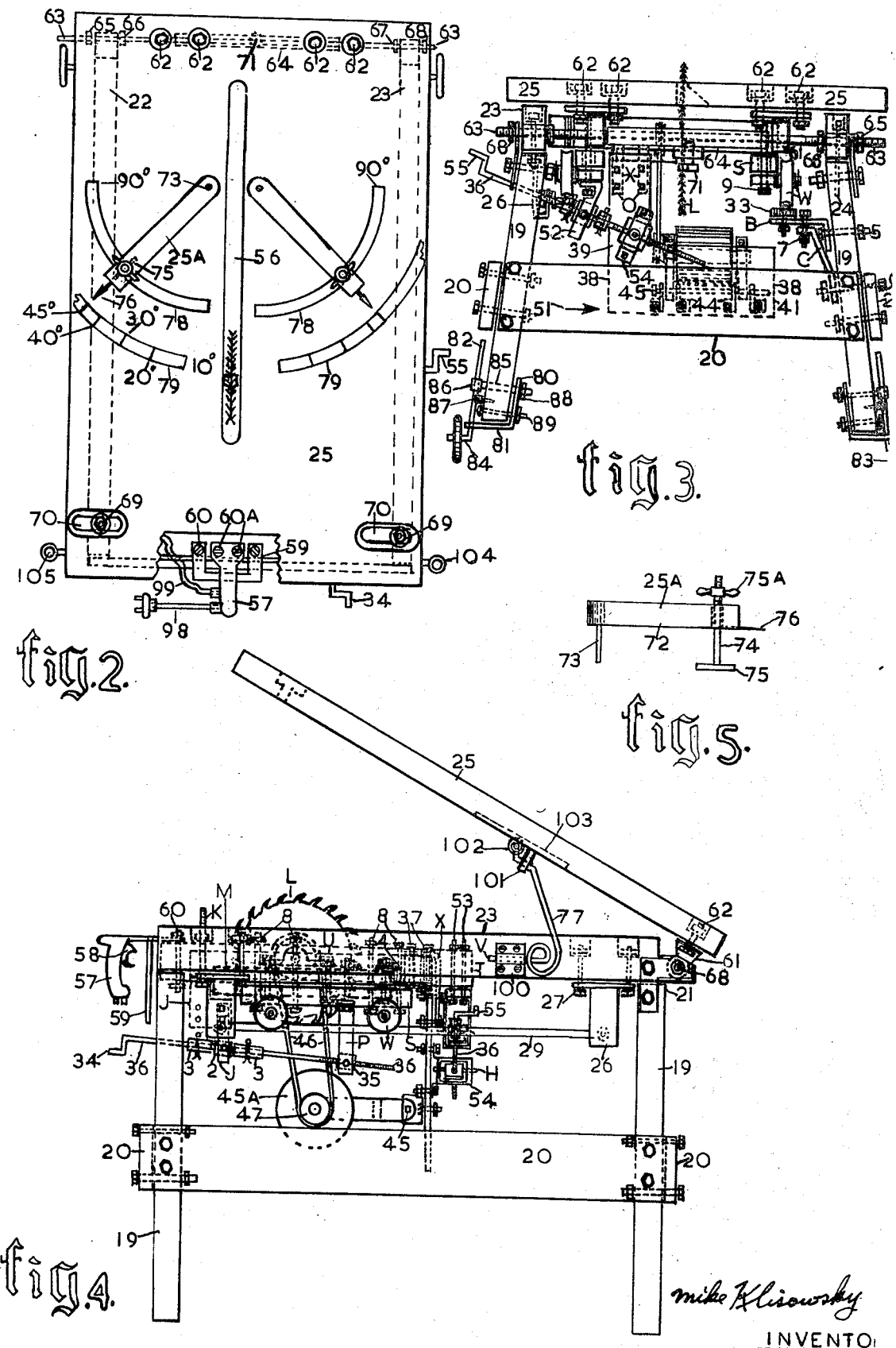

3,528,198
WOOD AND METAL SAWING AND TOOL GRINDING MACHINE
Mike Klisowsky, 3427 Dewdney Ave., Regina, Saskatchewan, Canada
Filed June 15, 1967, Ser. No. 646,320
Int. Cl. B24b 5/18, 7/00
U.S. Cl. 51—37      1 Claim

ABSTRACT OF THE DISCLOSURE

A supporting frame is provided with rails for a carriage which has a U-shaped plate hinged thereto for raising and lowering movement about a longitudinal axis. A mandril plate is disposed in and hinged to the U-shaped plate for raising and lowering movement about a transverse axis. A work engaging disc is rotatably mounted no the mandril plate and projects through a slot in a work supporting table mounted on the frame, the extent of projection of the disc through the slot being adjustable by raising or lowering the mandril plate about its hinge axis, while the plane of rotation of the disc is adjustable by raising or lowering the U-shaped plate about its hinge axis.

---

This invention relates to a wood and metal sawing and tool grinding machine, and may be constructed by any one skilled in this particular art if provided with the plans disclosing the various parts of the machine.

One object has been to provide a wood and metal sawing and tool grinding machine which has two trolley wheel rails attached to the frame of the machine on which trolley wheels travel and, the trolley wheels are adjustably secured to a sill which in turn is bolted to a frame member called the trolley frame, and approximately the entire moving parts of the machine are secured to this trolley frame.

A further and important object has been to provide a handle secured to the rearward cross member of the trolley frame, whereby the operator may with one hand rotate the trolley frame forward with its wood or steel cutting saw and with the other hand hold the material against a trammel provided, and if the trammel is properly set in fixed position at whatever angle or cross section cut through the material is desired the saw when pushed forward by the operator will cut according to the setting of the trammel. Note that while sawing, the saw is shoved forward away from the operator, and all flying particles are thrown away from the operator of the sawing and grinding machine and, the operator is enabled to see the pencil mark on the material to be sawn.

A further object has been to pivotally mount the forward end of the saw and grinding machine table on an adjustable bar or rod secured to the forward ends of the sills of the machine frame construction in order that the table be raised up by spring means, see FIG. 4 to allow for example the operator to remove the wood or steel cutting saw and place a grinding wheel on the saw mandril for grinding metal material.

A further object has been to provide a handle on the trolley frame which may be adjusted to suit a right hand or left hand operator, and also to provide a table wherein a trammel may be placed on either side of the table to suit a right or left handed operator.

A further object has been to provide a leg adjusting mechanism for raising and lowering the frame of the machine which in turn raises the table to suit short or tall operators.

A further object has been to provide rod and trunnion means for raising and lowering the saw.

A further object has been to provide rod and trunnion means for tilting the saw to any desired angle from 0 to 45 degrees.

A further object has been to provide an adjustable bar mounted through the forward end of the table supporting sills wherein the table is hinged thereto and the table may be adjusted into alignment with the saw by adjusting the nuts on the threaded ends of the adjustable bar.

A further object has been to provide a metal guard or apron secured at its upper end to the rearward end of the trolley frame and extends downward in front of the operator of the machine to protect the operator from any flying missiles that may come from the bottom of the saw or grinding wheels as the bottom of the saw or grinding wheels in turn towards the operator.

A further object is to provide an electric motor to drive the saws and grinding wheels for power to operate the machine.

A still further object is to provide in the power line a rheostat so that the speed of the sawing or grinding wheels may be governed by the operator operating the rheostat.

With the above more important objects in view and such other minor objects as may appear as the specification proceeds, my invention consists essentially in the arrangement and construction of parts being had to the accompanying drawings, in which:

FIG. 1 is a top plan or birds eye view in elevation illustrating approximately the entire machine;

FIG. 2 is a top plan or birds eye view in elevation of the table of the wood and metal sawing and tool grinding machine;

FIG. 3 is a front end view in elevation of FIG. 2;

FIG. 4 is a right hand side view in elevation of FIG. 2; and

FIG. 5 is a side view in elevation of the trammel.

Like numerals and like letter characters refer to like parts throughout the specification and drawings.

A wood and metal sawing and tool grinding machine according to my invention, comprises a frame construction of four upright legs 19 substantially supported by planking 20, bolted at their ends to the aforementioned legs 19 as illustrated in FIGS. 1, 3 and 4, and positioned on the upper ends 21, of the legs 19, are two longitudinal sills 22 and 23 being secured at their ends to the upper ends 21 of the legs 19, by leg bolts 24, see FIGS. 1 and 3 for leg bolts 24, and the frame of the machine thus far is held intact until the table 25 is placed and bolted thereon.

Viewing FIG. 1, brackets 26 are bolted to the sill 23 by colds 27 which are counter sunk in the sill 23 so as not to protrude above the upper surface of the sills 22 and 23 and allow the table 25 to lay directly on the sills 22 and 23. The brackets 26 turn upward in forked formation to receive the turned ends 28 of one trolley rail or track 29, and the turned ends 28 are threaded and two nuts 30 and 31 one on either side of the forked ends 32 of the brackets 26 are tightened to secure the rail or track 29 in adjusted level position as seen in FIG. 4; on the opposite side of the frame construction of the wood and metal sawing and tool grinding machine can be seen the other trolley rail track 33 which must be in the same horizontal plane as the rail or track just explained, and the four trolley wheels W, must all contact the rails or tracks 29 and 33 for their entire length in order that the trolley frame T remains steady while the machine is in motion. The trolley frame T is supported by four pulley shaped wheels W which are bolted to the underside of the trolley frame T by bolts 9, or the trolley wheels W may be attached to sills S whereby adjustment may be made to the position of the trolley wheels for accuracy purposes, and the bolts 8 go up through the sills S and trolley frame T and secure the sills and trolley frame in fixed position.

The trolley rail or track 33 just mentioned, is supported at each end by brackets B which are supported by a brace C, illustrated in dotted lines in FIG. 1, and seen in FIG. 3, secured to the bracket B by a bolt 7 and to a leg 19 of the machine by a bolt 6 and bolt 5 secures bracket B to legs 19.

A U-frame D (see FIG. 1) having its projecting ends secured to the trolley frame T by hinges E, and a mandril frame member M has its forward end secured to the forward projecting end N of the U-frame member D by hinges 4 to allow the mandril frame member to be raised and lowered. As the mandril frame is raised and lowered it raises and lowers the wood and metal cutting saws L. As is illustrated in FIGS. 3 and 4, raising and lowering of the mandril frame M is done by crank 34 and rod 36, positioned through sleeve 3, and through a trunnion block 2, which rocks on its trunnion pins H which are mounted in apertures through the trunnion block retaining bracket J. Trunnion bracket J, in turn, is secured to the rearward projecting end of frame D by bolts Y, and the rod 36 passes through the trunnion 2 and through another sleeve 3, the sleeves 3 being secured to the rod 36 by cotter pins going through the sleeves and through the rod 36. The crank rod 36 projects from the bracket J to the trunnion block 35 which is threaded to receive the threaded end 36 of the rod 36, and the trunnion block 35 is pivotally mounted with its trunnion pins H in apertures in the bracket. Bracket P is secured to the mandril frame M by bolts A, and when the crank and rod is turned to the right it pulls on the bracket P, and raises the mandril frame M and the saw L upwards. If the crank 34 is turned to the left the mandril frame is lowered.

On the forward projecting end N of the U-frame D (see FIG. 1) are two brackets X bolted by bolts 37, the brackets X being turned downward to support a frame member 38 of right angular or L formation (see FIGS. 3 and 4). The downward projecting portions O of the brackets X are bolted to the vertical portion 39 of the frame member 38 by bolts 40 seen in FIG. 1, and seen on projecting portions O of the brackets X, see FIG. 3. On the horizontal portion 41 of the frame member 38 is pivotally mounted at their ends 42 two motor suspending arms Z which extend rearwardly and are clamped to the motor bearings G seen in FIG. 1. There is a rod 45 going through four brackets 44 bolted to the horizontal portion 41 of the frame member 38 and through the forward ends 42 of the motor suspending arms Z to allow the arms Z to pivot at their ends 42. The motor 45A hangs on an endless belt 46 which extends around the motor pulley 47 and upward and around the mandril shaft pulley 48. The mandril shaft 49 is positioned and turns in bearing 50 which is bolted to the mandril frame M as seen in FIG. 1. The mandril frame is hinged to the forward end of the U-frame member D, and the U-frame member is hinged to the trolley frame member T, and bracketed at its forward end to the right angular or L frame member 38.

It is to be noted that if the angular or L frame member 38 is to be moved in the direction of the arrow 51, see FIG. 3, that the U-frame member will turn downwards taking with it the motor 45A and the mandril frame M, thus tilting the saw L to one side so that degree cuts through wood or metal may be accomplished. For the purpose of tilting the saw, a crank 55 and trunnion mechanism as already explained is secured by one bracket 52 bolted to the forward end of trolley frame member T, by bolts 53, and by brackets 54 bolted to the angle of L frame member 38.

When the trunnion operating crank 55 and rod 36 are turned to the left the threaded trunnion 35 will push on the bracket 54 and tilt the mandril frame M and saw from 0 to 45 degrees. The hinges E allow the U-frame member D to swing down and take with it the mandril frame M and saw L. For example, if a wide board is required to be cross cut leaving a bevel edge of say twenty degrees, then the wide board may be laid flat on the sawing machine table 25 at ninety degrees across the table in front of the trammel 25A and saw L, and when the saw has been tilted to one side at twenty degrees by the crank rod 36 and trunnion means heretofore explained, the saw will cross cut the board at an angle of twenty degrees.

It is important that the wide board just mentioned of necessity would have to be laid flat down on the table 25 as the saw L would not be far enough through the slot 56 and above the table 25 to cut the board just mentioned into two parts and if the board was set edge side upwards on the table in front of the saw. Thus the operator lays the board flat down on the table 25 and in front of the saw L and with its forward edge against the trammel 25A which guides the board across the table 25 at ninety degrees. Then the operator pencil marks the edge of the board which is next to him and in front of the saw and as the operator has already adjusted the tilting of the saw for a twenty degree angle cut, he holds the pistol grip handle 57 with his right hand, see FIG. 2, and lines up the pencil mark and the saw in alignment in front of him and pulls the power switch trigger 58, seen in FIG. 1, which connects the motor 45A with the electrical power. When the motor 45A starts the saw, and with the saw and the board and the mark on the board all directly in plain sight in front of the operator, the operator with his left hand steadies the board against the trammel 25A which has been set at ninety degrees as with his right hand he moves the trolley frame T to convey the saw L forward into the board, cutting it through at right angles and at the same time on a twenty degree bevel.

The foregoing explains an improvement over the prior art, as the operator has everything in front of him and can see exactly what he is doing without twisting his body and arms in order to operate the saw. Also, the saw turns away from the operator above the table 25 and throws all missiles away from the operator. Further, a wide metal apron 59 is attached at its upper end to the rearward end of trolley frame T by bolts or screws 60 as seen in FIGS. 2 and 4, to protect the operators body from flying missiles coming from the bottom of the saw under the table which turns towards the operator.

The table 25 has two substantial hinges 61 attached to its forward end by bolts 62 going up through apertures 62A and the hinges 61 are formed by an adjustable bar or rod 63 passing through their downward projecting portions 61, and a longitudinal pipe 64. The pipe 64 is positioned on the bar or rod 63 with its ends adjacent the hinges 61. A set screw 71 is threaded into a boss and its end contacts the rod or bar 63 to prevent the hinges 61 from moving either way along the bar or rod 63 in order that the table 25 may be adjusted sideways, on the bar or rod 63 by manipulating the four nuts 65, 66, 67 and 68, see FIGS. 1 and 3. As the slot 56 in the table 25 is just wide enough to allow the saw L tolerance therein it is necessary while tipping or tilting the saw to cut at various angles to move the table in the direction the saw is being tilted to one side in order that the saw does not touch the sides of the slot 56 seen in FIG. 2. For example, if the saw is to be tilted at forty degrees, nuts 65, 66, 67 and 68 on the threaded ends of the bar or rod 63 are turned away from the ends of the sills 22 and 23. Then nuts 69 are loosened a little from the bolts K within the slots 70 in the rear of the table 25, thus releasing the table 25 from its fixed moorings to allow the table to slide. The saw L and table 25 are then moved to one side until the saw reaches an angle of forty degrees. When the saw is in central position within the slot 56, all the nuts 65, 66, 67 68 and 69 are tightened, and the table will be held in fixed position on the sills 22 and 23 and at the same time support the upper frame structure of the sawing machine, and the adjustable table as hereinbefore described.

The trammel 25A seen in FIGS. 2 and 5 is used when cutting various short pieces of wood at various angles and may be adjusted or set for cutting angles from zero to forty-five degrees and turned to ninety degrees for accurate cross cutting of metal or wood. Trammel 25A comprises a piece of wood or steel bar 72 having a pin 73 in one of its ends and a rod 74 with a cross bar 75 at its lower end, the rod 74 projecting through the other end of the bar 72 and being threaded to receive a thumb nut 75A. There is an aperture in the table 25 close to the slot 56 to receive the pin 73 and the trammel swings on the pin 73 so that arrow 76 points to whatever degree the operator wishes, so he can hold the material either wood or metal, against the trammel while being sawed. Only one trammel 25A is required as it fits on both sides of the table 25 near the slot 56, two trammels being shown for illustration only. The right-hand trammel is for use by a left-handed operator who operates the saw with his left hand and holds the material to be sawn with his right hand, making the sawing machine just as convenient for a left-handed operator as it is for a right-handed operator.

Two quadrants 78 are provided, one on either side of the slot 56 on the table 25. Rod 74 of the trammel 25A projects through these quadrants and the cross bar 75 at the lower end of the rod 74 is turned crossway under the quadrants 78 so that when the thumb nut 75 is tightened, the cross bar 75 will hold against the under side of the table and thus hold the trammel 25A in fixed position. Also provided are marking quadrants 79 shown with degrees marked thereon for the point of the arrow 76, the quadrants 79 being inlaid on the table 25, and this is another new departure in sawing machines.

When grinding operations of tools and the like, it is necessary to raise the table 25 on its hinged positioned by bolts 62 at its forward end, and the operator must first remove the nuts 69 from the bolts K seen in FIGS. 1 and 4 which releases the rearward end of the table 25 and enables the coil spring 77 to automatically raise the table up to allow the operator to remove the nut 78 on the end of the mandril shaft 49 and remove the saw L and place a grinding wheel on the mandril shaft, and replace and tighten the nut 78 back on the end of the mandril shaft 49 to secure the grinding wheel in fixed position on the mandril shaft for high speed grinding operations. The grinding of tools and the like done in a sawing machine is a new departure in sawing machines.

FIGS. 1 and 3 illustrate a mechanism for raising and lowering the sawing machine to suit short or tall operators, and viewing the mechanism in FIGS. 1 and 3 there is a metal strap 80 having its end 81 turned under the bottom end of the leg 19. In the end 81 there is a square aperture to receive the square shank 82, in order to retain a rubber tired wheel 83 in true alignment with the frame construction of the sawing machine. The axle 84 seen in FIG. 3 is welded to the bottom of the square shank 82 and supports the wheel 83. The strap 80 projects upward along the inside of the leg 19 for a short distance where the stem 85 of an eye bolt goes through the leg 19 of the sewing machine. The square shank 82 goes through a square aperture in the head 86 of the eye bolt, the square eye of the eye bolt, and there is a fulcrum 87 on leg 19 close to head 86 of the eye bolt to hold the shank 82 away from the leg 19. The strap 80 is bolted by two carriage bolts 89 to the bottom end of the leg 19 of the sawing machine to hold the whole assembly intact while adjustments are made. To raise or lower the sawing machine, loosen eye bolt nut 88 and move the shank 82 up or down as desired, and tighten nut 88 to cause the head of the eye bolt to pull the shank 82 down on the fulcrum 87. Thus, to adjust one leg all that is necessary is to loosen the nut 88, move the shank 82 and tighten the nut 88 again while the wheel 83 cannot get out of alignment while the adjustment is being made.

The trolley frame T has a handle 57 as hereinbefore mentioned which is secured direct to the rearward end of the trolley frame by bolts or screws 60A. Further, as seen in FIG. 1 a handle 90 is rotatably mounted on a stub axle 91. A set screw 92 may be set to allow the handle 90 to turn on the stub axle 91, or the set screw 92 may be tightened to hold the handle 90 in fixed position to suit the operator. The stub axle 91 is secured at its forward end to a plate 93, and the plate 93 is positioned on a frame 94 having a longitudinal slot 95 therein, plate 93 having a cross bar attached to it which is positioned in the slot 95 to hold the stub axle 91 at right angles to the frame 94. Frame 94 is bolted to the rearward end of the trolley frame T by bolts 96, and the handle 90 may be horizontally moved along the slot 95 to any position required by the operator. The frame 94 also has an integral apron 59 projecting downwardly in front of the operator to protect him as already mentioned.

The dotted line 97 in FIG. 1 indicates the position of the upper end of the apron which is integral with the frame member 94.

Two electric conveying wires are attached to the handles 57 and 90 and in FIG. 1 is seen the electric power intake wire 98 and the electric conveying wire 99 attached to a switch in the handle 90 to the electric motor 45A. When the trigger 58 is pulled, the electric current is transmitted from the electric power conveying wire 98 through the switch in the handle 90 and through the conveying wire 99 to the motor 45A. As it is necessary to govern the speed of the motor at times when needed, there is for that purpose a rheostat placed in the electric power line 98 in some place close to the operator so he can conveniently change the speed of the motor as desired. It is not necessary to illustrate the rheostat.

The table raising coil spring 77 is seen attached to the sill 23 in FIG. 4 affixed at its lower end by a plate 100 secured to the sill by wood screws and at its upper end to a bracket 101 secured to the under edge of the table by wood screws. A small roller 102 at the upper end of spring 77 runs on a metal track 103 inlaid in the under side of the outer side of the table 25. Two springs 77 are attached to the sills 22 and 23 directly opposite each other, one on each side of the frame X. Brackets 101 prevent the springs 77 from throwing the table too high or over, as when the rollers wheels 102 are stopped by the brackets 101.

There are two feet 104 attached to the lower ends of the shanks 82, and they have apertures 105 therein to receive bolts, as solid rubber cushions are to be bolted to their undersides for gripping the floor. There is a pin 106 going through the sill 23 and into the trolley frame T which locks the trolley frame in fixed position when using the machine for grinding operations. The invention as hereinbefore explained may be mostly made of wood for inexpensive manufacture, and its mechanism is compact and simple.

Having thus described my invention what it is, and what I wish to protect by Letters Patent of the United States is:

1. In an adjustable sawing or grinding machine, the combination of a supporting frame elongated in the horizontal direction, a set of rails fixedly secured to said frame and extending longitudinally thereof, a carriage movable along said rails, a U-shaped plate including a longitudinal bight member and a pair of transverse members defining an opening, hinges connecting the ends of said transverse members to said carriage for swingable raising and lowering adjustment of said U-shaped plate about a horizontal hinge axis extending longitudinally relative to said frame, a rectangular mandril plate disposed in said opening of said U-shaped plate and hingedly connected at one edge thereof to one of said transverse members for swingable raising and lowering adjustment of the mandril plate about a hinge axis at right angles to the first mentioned horizontal hinge axis, a shaft rotatably journalled on said mandril plate with its axis parallel to the mandril plate, drive means supported by the mandril plate for rotating said shaft, a work engaging disc secured to and rotatable with said shaft, a work supporting table mounted on said frame above said carriage and provided with a longitudinal slot having said work engaging disc projecting therethrough, the extent of projection of said disc through said slot being adjustable by said swingable raising and lowering adjustment of said mandril plate and the plane of rotation of said disc in said slot being adjustable by said swingable raising and lowering adjustment of said U-shaped plate, and means laterally adjustably mounting said work supporting table on said frame to accommodate said work engaging disc in its adjusted position.

References Cited

UNITED STATES PATENTS 2,515,008  7/1950  Humphrey _____ 143—47.5
2,548,279  4/1951  Young _____ 143—47.5 X JAMES L. JONES, Jr., Primary Examiner U.S. Cl. X.R.

143—47